United States Patent
Coughlan et al.

(10) Patent No.: US 8,498,403 B1
(45) Date of Patent: Jul. 30, 2013

(54) METHOD AND APPARATUS FOR MANAGING TRAINING OF CALL CENTER AGENTS

(75) Inventors: Marc William Joseph Coughlan, Balmain (AU); Alexander Quentin Forbes, Westleigh (AU); Ciaran Gannon, Killara (AU); Peter Donald Runcie, Basking Ridge, NJ (US); Ralph Warta, Gladesville (AU)

(73) Assignee: Avaya Inc., Basking Ridge, NJ (US)

( * ) Notice: Subject to any disclaimer, the term of this patent is extended or adjusted under 35 U.S.C. 154(b) by 1374 days.

(21) Appl. No.: 12/228,507

(22) Filed: Aug. 13, 2008

(51) Int. Cl.
*H04M 3/00* (2006.01)

(52) U.S. Cl.
USPC ................................. 379/265.06

(58) Field of Classification Search
USPC ............ 379/265.02, 265.06–265.08, 265.11; 705/7.42
See application file for complete search history.

(56) References Cited

U.S. PATENT DOCUMENTS

| | | | | |
|---|---|---|---|---|
| 5,721,770 A | * | 2/1998 | Kohler | 379/265.12 |
| 7,110,525 B1 | * | 9/2006 | Heller et al. | 379/265.11 |
| 7,151,826 B2 | * | 12/2006 | Shambaugh et al. | 379/265.02 |
| 2009/0089138 A1 | * | 4/2009 | Minert et al. | 705/9 |
| 2010/0070266 A1 | * | 3/2010 | Mcneill et al. | 704/201 |

* cited by examiner

*Primary Examiner* — Duc Nguyen
*Assistant Examiner* — Sonia Gay
(74) *Attorney, Agent, or Firm* — John C. Moran

(57) ABSTRACT

A method and apparatus trains agents in a call center by directing a plurality of telecommunication calls to an agent by a controller wherein a percentage of the telecommunication calls are unskilled telecommunication calls that the agent is unskilled at processing; calculating by the controller average success of the agent in handling all of the unskilled telecommunication calls; calculating by the controller average stress of the agent in handling all of the unskilled telecommunication calls; increasing the percentage of unskilled telecommunication calls by the controller upon average success being greater than a predefined level of success and the average stress being less than a predefined level of stress; and stopping after the percentage equals a predefined percentage.

18 Claims, 4 Drawing Sheets

METHOD AND APPARATUS FOR MANAGING TRAINING OF CALL CENTER AGENTS

TECHNICAL FIELD

This invention relates to training agents in a call center for performing additional types of work.

BACKGROUND OF THE INVENTION

Within the art, a number of different types of customer resource management systems (also referred to as call centers, contact centers, or automatic call distribution systems) are known. One of the problems in customer resource management systems is to retrain agents who are good at performing one type of work in a customer resource management system but need to be trained to perform an additional type of work. This retraining is commonly referred to as upskilling. Within the prior art, this retraining process is a manual process controlled by the agent's supervisor who must constantly monitor and set goals for the agent.

SUMMARY OF THE INVENTION

A method and apparatus trains agents in a call center by directing a plurality of telecommunication calls to an agent by a controller wherein a percentage of the telecommunication calls are unskilled telecommunication calls that the agent is unskilled at processing; determining by the controller success of the agent in handling each of the unskilled telecommunication calls; determining by the controller stress of the agent in handling each of the unskilled telecommunication calls; calculating by the controller average success of the agent in handling all of the unskilled telecommunication calls; calculating by the controller average stress of the agent in handling all of the unskilled telecommunication calls; increasing the percentage of unskilled telecommunication calls by the controller upon average success being greater than a predefined level of success and the average stress being less than a predefined level of stress; and stopping after the percentage equals a predefined percentage.

DETAILED DESCRIPTION

Figure 1:
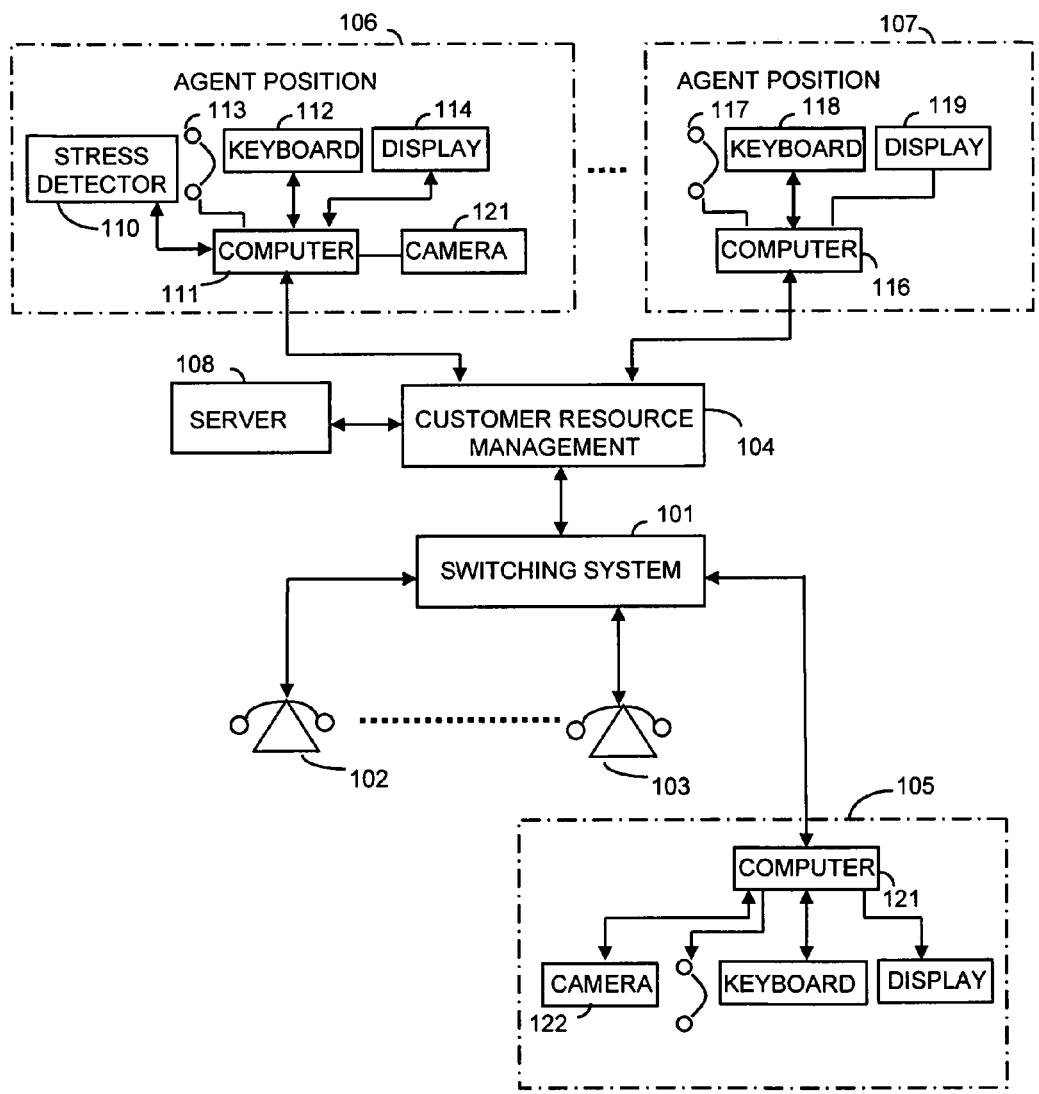
FIG. 1 illustrates an embodiment of a system.

FIG. 1 illustrates an embodiment. Call center 104 is providing service via switching system 101 for telephone sets 102-103. Agents utilizing agent positions 106-107 interact with the customers utilizing telephones sets 102-103 and customer terminal 105. In a first embodiment, call center 104 is directed by the agent's supervisor to provide the agent who is being upskilled with a percentage of a new type of work which the agent is not skilled at providing in addition to types of work that the agent is skilled in providing. As the agent's skill in providing the new type of work improves, call center 104 increases the percentage of the new type of work until a predetermined goal is reached. The agent's supervisor predetermines the percentage increments of the new type of work that will be added. In a second embodiment, the agent's supervisor may change the percentage increments at a later time. Call center 104 determines that the agent is improving with respect to the new type of work by monitoring the agent's stress level and success level in providing the new type of work from the point of view of results achieved. In a third embodiment, if the workload of the call center exceeds a predefined threshold, the agent's percentage of the new type of work is temporarily decreased until the workload of the call center drops below the predefined threshold.

The stress level of the agent may be measured by voice analysis of the agent, textual analysis of the agent, visual analysis of the agent, or by measuring physiological parameters of the agent such as blood pressure, skin resistance, pulse rate, etc. such parameters could be measured by a stress detector attached to the agent position such as stress detector 110.

The success level can be measured by the number of customer purchases achieved by the agent in interactions with customers. The success level could also be measured for non-purchase type work by measuring the emotions of customers during calls. For example, if a customer is happy or satisfied at the end of the call, the agent can be considered to have been successful.

Figure 2:
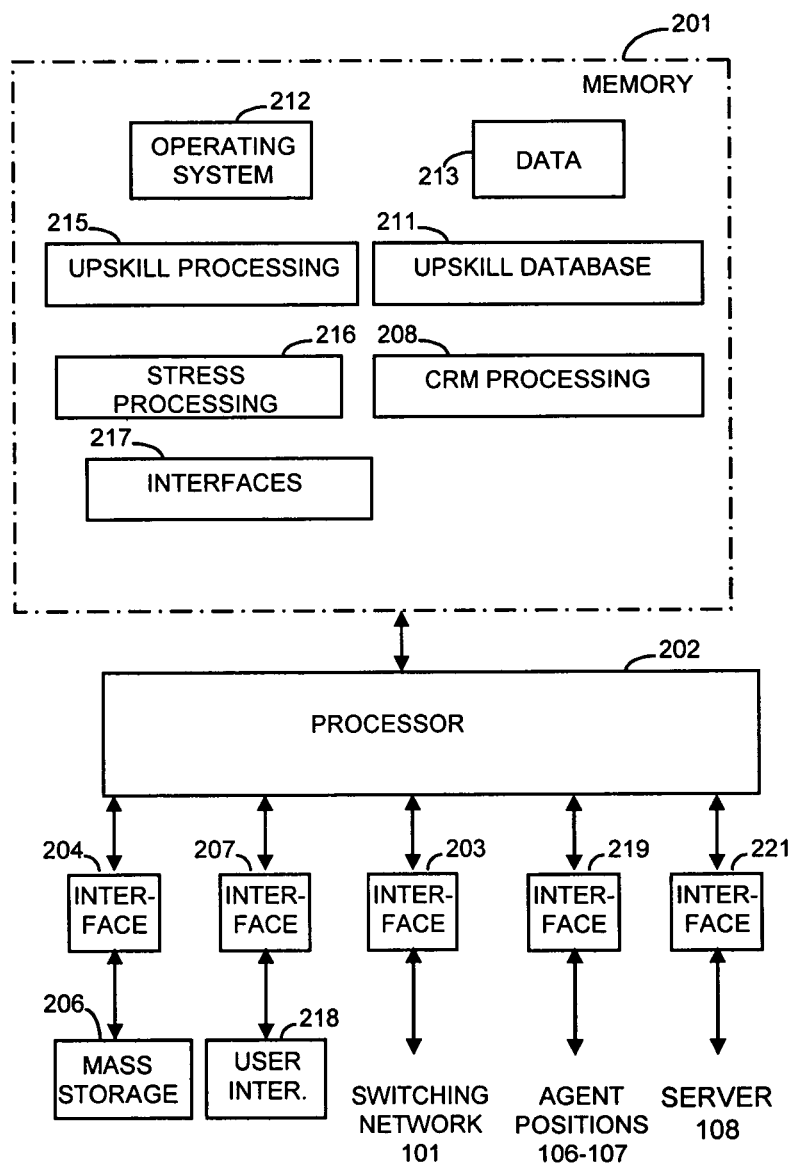
FIG. 2 illustrates an embodiment of a customer resource management system.

FIG. 2 illustrates, in block diagram form, one embodiment of call center 104. Processor 202 provides the overall control for the functions of call center 104 by executing programs and storing and retrieving data from memory 201. Processor 202 connects to switching network, 101 via interface 203. Processor 202 interfaces to user interface 218 via interface 207. Processor 202 interfaces to switching network 101 via interface 203. Processor 202 interfaces to agent positions 106-107 via interface 219. Processor 202 interfaces to server 108 via interface 221. Processor 202 performs the operations of call center 104 by executing the routines illustrated in memory 201.

Operating system 212 provides the overall control and the necessary protocol operations. The communication and control of the various interfaces illustrated in FIG. 2 is provided by interfaces routine 217. Call center processing 208 provides overall control of call center 104.

Stress processing 216 provides stress detection operations with data being stored in upskill database 211. Stress processing 216 may use voice analysis to determine stress. The use of voice analysis to determine stress is well known in the art and is detailed in U.S. Pat. No. 7,283,962 or U.S. Patent Application No. 2003/0033145. If the emotions of customers are being detected, stress processing 216 would use voice analysis to perform this detection. If the physiological parameters are being utilized to detect stress in an agent, stress processing 216 would obtain this data from a stress detector such as stress detector 110 via an agent computer such as computer 111 as illustrated in FIG. 1. If the visual analysis is being utilized to detect stress in an agent or customer, stress processing 216 would obtain visual data from a camera such as camera 121 via an agent computer such as computer 111 or camera 123 via a customer computer 122 as illustrated in FIG. 1. The use of visual analysis to determine stress is well known in the art and is detailed in U.S. Patent Application publication 2005/0069852 A1. Visual analysis could include but is not limited to analysis of the eyes of the customers and agents. If textual analysis is being used, the text would be obtained via the agent or customer's keyboard input via the agent or customer keyboard. These U.S. Patent Application publications and U.S. Patent are hereby incorporated by reference.

Upskill processing 215 provides control over the upskill training of the agents using information from stress processing 216 and by determining success levels for agents. Upskill processing 215 stores and retrieves data in/from upskill database 211. Stress processing 216 stores stress information for the agents in upskill database 211 for use by upskill processing 215.

In another embodiment, server 108 of FIG. 1 executes upskill processing and stress processing as well as storage for upskill data by communication with customer resource management system 104.

Figure 3:
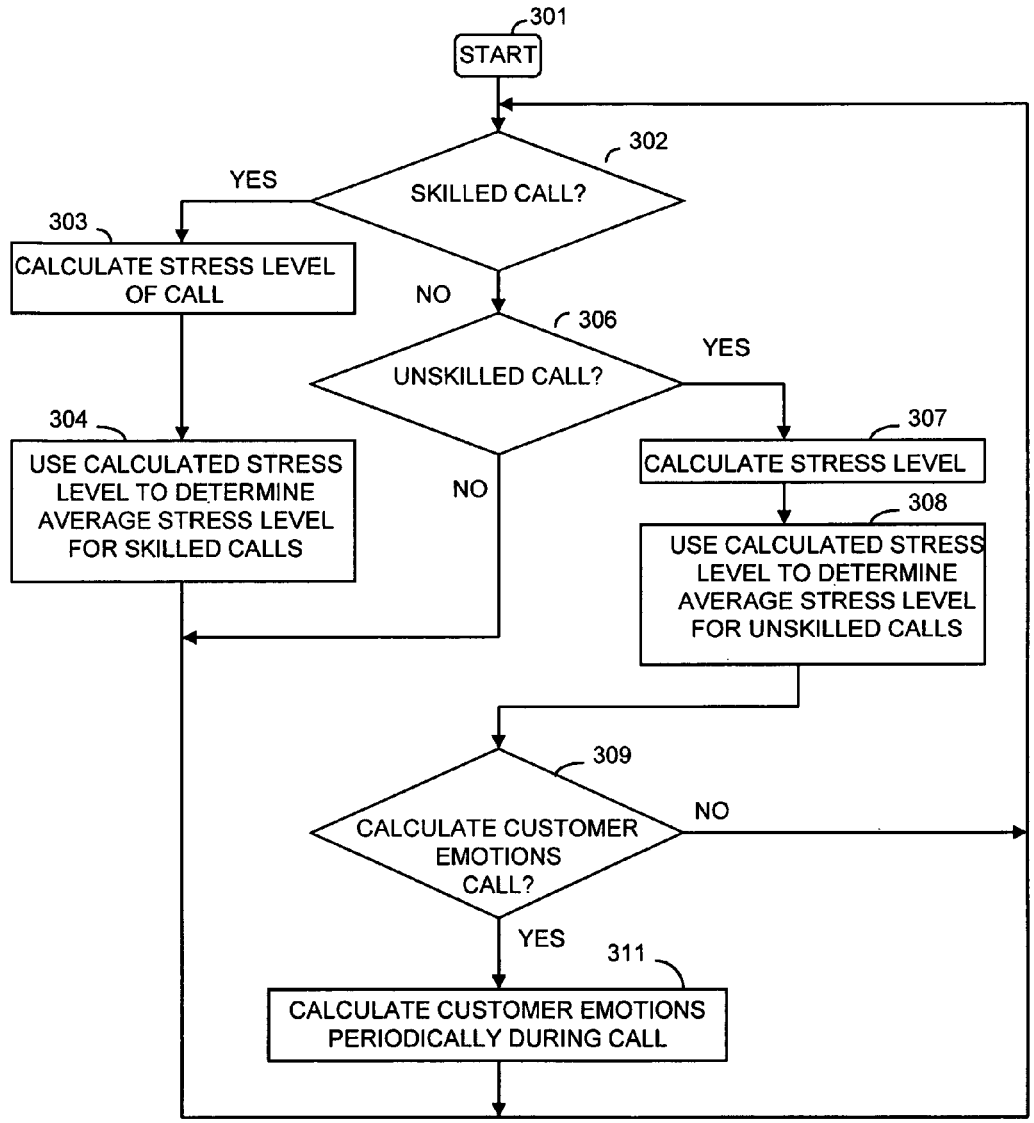
FIG. 3 illustrates, in flowchart form, operations performed by stress processing.

FIG. 3 illustrates, in flowchart form, operations performed by stress processing 216 of FIG. 2. These operations are performed for each agent who is being retrained to handle a new type of call (also referred to as upskilling). The operations are performed each time an agent is given a call by customer resource management system 104. After being started in block 301, decision block 302 determines if the call is a type of call that the agent is skilled at handling. If the answer is yes, block 303 calculates the stress level for this call, and block 304 averages the calculated stress level into an average stress level for all skilled calls handled by the agent and stores the result in upskill database 211 before returning control to decision block 302.

Returning to decision block 302, if the answer is no, control is transferred to decision block 306. The latter decision block determines if the call is a type of call for which the agent is unskilled at handling. If the answer is yes, control is transferred to block 307 which calculates the stress level of the agent during the call. Then, block 308 averages the calculated stress level into the average stress level for unskilled calls stored in upskill database 211 and stores this information in upskill database 211 before transferring control to decision block 309. If the answer in decision block 306 is no, control is transferred back to decision block 302.

After receiving control from block 308, decision block 309 determines if the emotions of the customer are to be calculated during this call. These calculated emotions may be utilized to determine customer satisfaction. The calculated customer emotions are periodically stored over the duration of the call by block 311 in upskill database 211. After execution, block 311 returns control back to decision block 302.

Figure 4:
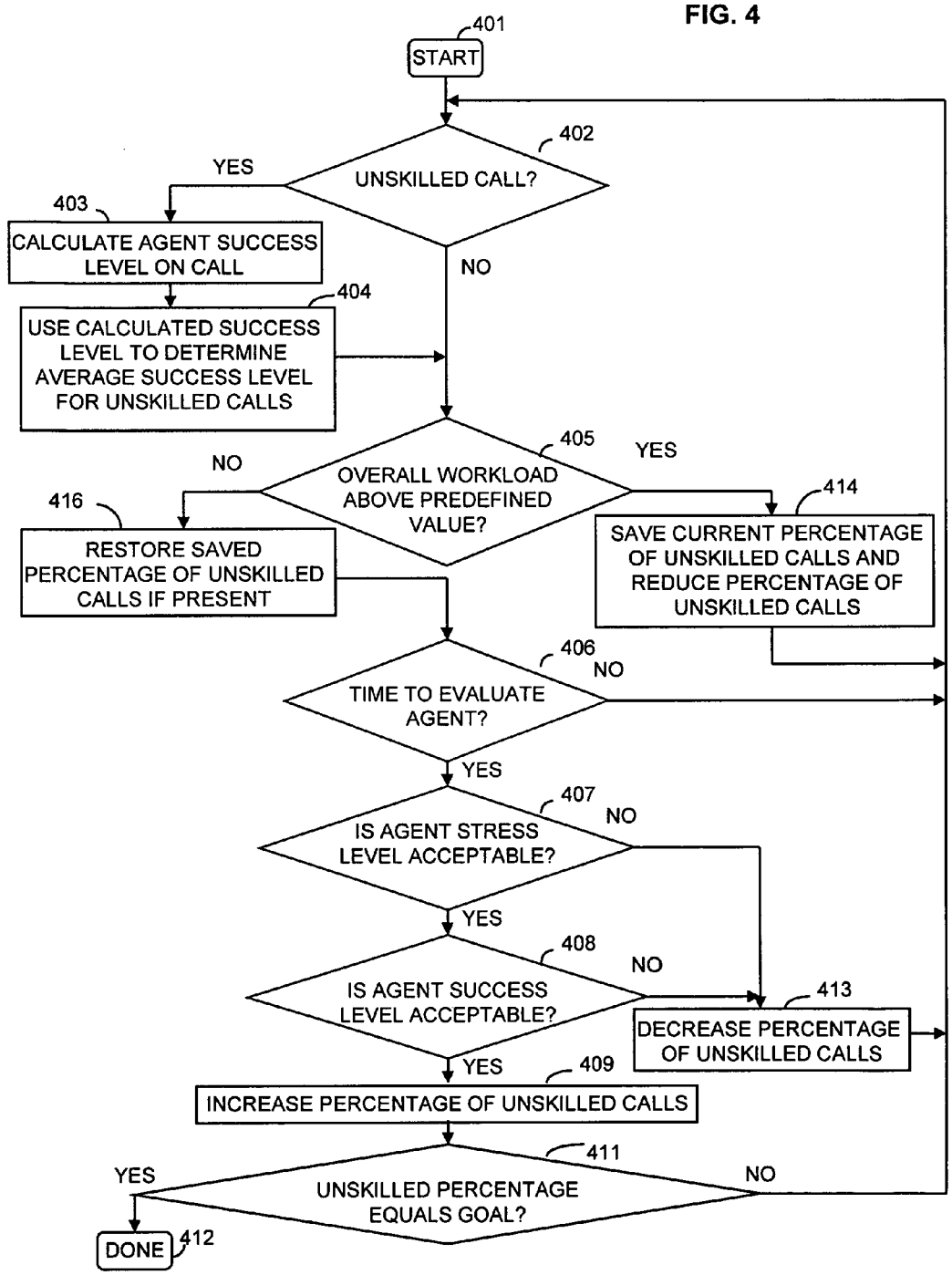
FIG. 4 illustrates, in flowchart form, operations performed by upskilled processing.

FIG. 4 illustrates, in flowchart form, operations performed by upskill processing 215. After being started in block 401, decision block 402 determines if the call presently being handled by the agent is an unskilled call. If the answer is yes, block 403 calculates the agent's success level on the call. This success level may be determined by whether or not the agent made a sale or the level of satisfaction or other emotions of the customer during the call. After receiving control from block 403, block 404 averages the calculated success level into an average success level stored in upskill database 211 for unskilled calls with the result being stored in upskill database 211 before transferring control to decision block 405. If the answer in decision block 402 was no, control is transferred to decision block 405.

Decision block 405 determines if the overall workload of the call center has exceeded a predefined value/threshold. If the answer is yes, the training of the agent to handle unskilled calls will be modified, and the percentage of unskilled calls handled by the agent will be reduced by execution of block 414. Block 414 saves the current percentage of unskilled calls being handled by the agent for future restoration by block 416 and reduces the percentage of unskilled calls that the agent will handle by a predefined percentage before transferring control back to decision block 402. Note, that this predefined percentage can reduce the number of unskilled calls handled by the agent to zero. If the answer in decision block 405 is no, control is transferred to block 416. The latter block restores the save percentage of unskilled calls if this is the first time that block 416 has been executed after the overall workload has dropped below the predefined value before transferring control to decision block 406. Decision block 406 determines if the period of time has elapsed for the evaluation of the agent since the agent's progress is only periodically evaluated. If the answer is no in decision block 406, control is transferred back to decision block 402. If the answer is yes in decision block 406, control is transferred to decision block 407.

Decision block 407 accesses the average stress level information for the agent from upskill database 211. This information had been stored there by stress processor 216. In one embodiment, decision block 407 compares the stress level for unskilled calls against the stress level for skilled calls and would only allow the stress level for unskilled calls to be a predefined percentage higher than the stress level for skilled calls. In another embodiment, decision block 407 would not allow the stress level for unskilled to be larger than predefined level.

If the answer is no in decision block 407, control is transferred to block 413. The latter block decreases the percentage of unskilled calls that the agent will handle before returning control to decision block 402. If the answer is yes in decision block 407, control is transferred to decision block 408.

Decision block 408 accesses the agent's average success level from upskill database 211 and determines if this level is acceptable. If the answer is no, control is transferred to block 413 whose operations have already been described. If the answer in decision block 408 is yes, control is transferred to block 409.

Block 409 increases the percentage of unskilled calls that will be handled by the agent before transferring control to decision block 411. The latter decision block tests to see whether the agent is now receiving a percentage of unskilled calls that meets the goal set for the agent. If the answer is yes, the process is done and control is transferred to block 412. If the answer in decision block 411 is no, control is transferred back to decision block 402.

When the operations of a computer, processor or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The computer, processor or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the computer, processor or server is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for training agents in a call center, comprising the steps of:
    (1) directing a plurality of telecommunication calls to an agent by a controller wherein a predetermined percentage of the telecommunication calls are unskilled telecommunication calls that the agent is unskilled at processing;
    (2) determining by the controller success of the agent in handling each of the unskilled telecommunication calls;
    (3) determining by the controller stress of the agent in handling each of the unskilled telecommunication calls;
    (4) calculating by the controller average success of the agent in handling all of the unskilled telecommunication calls;
    (5) calculating by the controller average stress of the agent in handling all of the unskilled telecommunication calls;
    (6) increasing the predetermined percentage of unskilled telecommunication calls by the controller upon average success being greater than a predefined level of success and the average stress being less than a predefined level of stress; and
    repeating steps (1)-(6).

2. The method of claim 1 further comprises the step of stopping training of agent upon the percentage of unskilled telecommunication calls being equal to or greater than a predefined percentage of unskilled telecommunication calls.

3. The method of claim 2 further comprises the step of receiving by the controller the predefined percentage from a manager of the agent.

4. The method of claim 1 further comprises the step of decreasing the percentage of unskilled telecommunication calls by the controller upon average success being less than a predefined level of success or the average stress being greater than a predefined level of stress before execution of the step of repeating.

5. The method of claim 1 wherein the step of calculating success comprises step of determining a number of sales made by the agent for the all of the unskilled telecommunication calls.

6. The method of claim 1 wherein the step of calculating success comprises the step of calculating emotions of customers during the all of the unskilled telecommunication calls.

7. The method of claim 6 wherein the step of calculating emotions comprises the step of performing voice, visual, or textual analysis of the customers.

8. The method of claim 1 wherein the step of determining stress of the agent comprises the step of performing voice, visual, or textual analysis of the agent.

9. The method of claim 1 wherein the step of determining stress of the agent comprises the step of performing physiological analysis of the agent.

10. A non-transitory computer-readable medium for training agents in a call center, comprising computer-executable instructions, which when executed by a processor, are configured for:
    (1) directing a plurality of telecommunication calls to an agent wherein a predetermined percentage of the telecommunication calls are unskilled telecommunication calls that the agent is unskilled at processing;
    (2) determining success of the agent in handling each of the unskilled telecommunication calls;
    (3) determining stress of the agent in handling each of the unskilled telecommunication calls;
    (4) calculating average success of the agent in handling all of the unskilled telecommunication calls;
    (5) calculating average stress of the agent in handling all of the unskilled telecommunication calls;
    (6) increasing the predetermined percentage of unskilled telecommunication calls upon average success being greater than a predefined level of success and the average stress being less than a predefined level of stress; and
    repeating computer-executable instructions (1)-(6).

11. The non-transitory computer-readable medium of claim 10 further comprises computer-executable instructions, which are executed by a processor, for stopping training of agent upon the percentage of unskilled telecommunication calls being equal to or greater than a predefined percentage of unskilled telecommunication calls.

12. The non-transitory computer-readable medium of claim 11 further comprises computer-executable instructions, which are executed by a processor, for receiving the predefined percentage from a manager of the agent.

13. The non-transitory computer-readable medium of claim 10 further comprises computer-executable instructions, which are executed by a processor, for decreasing the percentage of unskilled telecommunication calls upon average success being less than a predefined level of success or the average stress being greater than a predefined level of stress before execution of the step of repeating.

14. The non-transitory computer-readable medium of claim 10 wherein the computer-executable instructions for calculating success comprise computer-executable instructions, which are executed by a processor, for determining a number of sales made by the agent for the all of the unskilled telecommunication calls.

15. The non-transitory computer-readable medium of claim 10 wherein the computer-executable instructions for calculating success comprise computer-executable instructions, which are executed by a processor, for calculating emotions of customers during the all of the unskilled telecommunication calls.

16. The non-transitory computer-readable medium of claim 15 wherein the computer-executable instructions for calculating emotions comprise computer-executable instructions, which are executed by a processor, for performing voice, visual, or textual analysis of the customers.

17. The non-transitory computer-readable medium of claim 10 wherein the computer-executable instructions for determining stress of the agent comprise computer-executable instructions, which are executed by a processor, for performing voice, visual, or textual analysis of the agent.

18. The non-transitory computer-readable medium of claim 10 wherein the computer-executable instructions for determining stress of the agent comprise computer-executable instructions, which are executed by a processor, for performing physiological analysis of the agent.

* * * * *